United States Patent
Colignon

(10) Patent No.: US 7,634,907 B2
(45) Date of Patent: Dec. 22, 2009

(54) SYSTEM FOR ASSISTING IN THE REGENERATION OF MOTOR VEHICLE DEPOLLUTION MEANS INTEGRATED IN AN EXHAUST LINE OF A VEHICLE DIESEL ENGINE

(75) Inventor: Christophe Colignon, Levallois Perret (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 29 days.

(21) Appl. No.: 10/595,635

(22) PCT Filed: Oct. 5, 2004

(86) PCT No.: PCT/FR2004/002514

§ 371 (c)(1),
(2), (4) Date: May 1, 2006

(87) PCT Pub. No.: WO2005/049985

PCT Pub. Date: Jun. 2, 2005

(65) Prior Publication Data

US 2007/0130917 A1    Jun. 14, 2007

(30) Foreign Application Priority Data

Nov. 7, 2003    (FR) .................................. 03 13158

(51) Int. Cl.
*F01N 3/00*    (2006.01)
(52) U.S. Cl. ............................. 60/286; 60/274; 60/280; 60/285; 60/295; 60/297
(58) Field of Classification Search .................... 60/285, 60/286, 280, 295, 297, 303, 274; 44/358, 44/359, 363, 366
See application file for complete search history.

(56) References Cited

U.S. PATENT DOCUMENTS 4,655,037 A * 4/1987 Rao ............................ 60/274
6,536,209 B2    3/2003 Fluga et al.

(Continued)

FOREIGN PATENT DOCUMENTS

DE    19963930 A    7/2001

(Continued)

OTHER PUBLICATIONS

Patent Abstracts of Japan vol. 2002, No. 12, Dec. 12, 2002 & JP 2002235590 of Aug. 23, 2002.

(Continued)

*Primary Examiner*—Tu M Nguyen
(74) *Attorney, Agent, or Firm*—Nicolas E. Seckel

(57) ABSTRACT

System in which the depollution device is associated with an oxidation catalyst, and the engine is associated with a common rail for feeding it with fuel and adapted to implement a regeneration strategy using at least one post-injection of fuel into the cylinders. In the system, a request for regeneration (req.RG) can be detected, whether the engine is in a stage of idling can be detected, a temperature downstream from the catalyst can be acquired, a maximum duration for post-injection application during the stage of idling can be determined on the basis of said temperature, and the post-injection can be progressively reduced as soon as the duration of use has reached the maximum duration.

22 Claims, 1 Drawing Sheet

U.S. PATENT DOCUMENTS

| | | |
|---|---|---|
| 6,574,956 B1 | 6/2003 | Moraal et al. |
| 6,594,990 B2 | 7/2003 | Kuenstler et al. |
| 6,598,387 B2 | 7/2003 | Carberry et al. |
| 6,666,019 B2 * | 12/2003 | Kawatani et al. ............. 60/286 |
| 6,763,659 B2 | 7/2004 | Watanabe et al. |
| 6,802,180 B2 * | 10/2004 | Gabe et al. ................... 60/285 |
| 6,931,842 B2 | 8/2005 | Ohtake et al. |
| 6,951,100 B2 * | 10/2005 | Kuboshima et al. .......... 60/311 |
| 7,017,337 B2 * | 3/2006 | Plote et al. ................... 60/295 |
| 7,021,050 B2 | 4/2006 | Nishimura et al. |
| 7,062,906 B2 * | 6/2006 | Otake et al. .................. 60/295 |
| 7,104,050 B2 * | 9/2006 | Sato et al. .................... 60/295 |
| 7,137,247 B2 * | 11/2006 | Koga et al. ................... 60/295 |
| 7,159,391 B2 * | 1/2007 | Kogo et al. ................... 60/297 |
| 7,237,379 B2 | 7/2007 | Nakano et al. |
| 2002/0007629 A1 * | 1/2002 | Asanuma et al. .............. 60/297 |

FOREIGN PATENT DOCUMENTS

| | | |
|---|---|---|
| DE | 10007049 A | 8/2001 |
| EP | 1174612 A | 1/2002 |
| EP | 1176290 A | 1/2002 |
| EP | 1234959 A | 8/2002 |
| EP | 1281852 A | 2/2003 |
| FR | 2805568 A | 8/2001 |
| FR | 2831923 A | 5/2003 |
| WO | WO 0238933 A1 * | 5/2002 |

OTHER PUBLICATIONS

International Search Report dated Mar. 1, 2005.
International Search Report dated Feb. 15, 2005 in PCT/FR2004/002494 (U.S. Appl. No. 10/595,623).

* cited by examiner

SYSTEM FOR ASSISTING IN THE REGENERATION OF MOTOR VEHICLE DEPOLLUTION MEANS INTEGRATED IN AN EXHAUST LINE OF A VEHICLE DIESEL ENGINE

BACKGROUND ART

The present invention relates to a system for assisting in the regeneration of depollution means associated with oxidation catalyst-forming means and integrated in an exhaust line of a motor vehicle diesel engine.

More particularly, the invention relates to a system in which the engine is associated with common manifold or "rail" means for feeding the cylinders of the engine with fuel and adapted, at constant torque, to implement a strategy of regeneration by injecting fuel into the cylinders in at least one post-injection operation.

During regeneration of depollution means such as, for example, a particle filter, stages during which the vehicle accelerator pedal is being raised (no fuel injection in normal operation), and stages during which the engine is idling (exhaust temperature very low), are problematic because they cause the temperature of the exhaust to drop, i.e. the temperature of the exhaust line and of the elements integrated therein.

The use of one or more post-injections during such stages in the lifetime of the engine can serve to limit the drop of temperature in the exhaust line, by relying on catalytic conversion of the hydrocarbons (HCs) produced by the combustion of the post-injection(s) in the engine.

Nevertheless, such strategies rely on the catalyst-forming means reacting in exothermic manner, where said means comprise, for example, an oxidation catalyst or a NOx trap with a function of oxidizing CO and HC, said means being assumed to be active.

During stages in which the engine is returning to idling, as a result of the accelerator pedal being raised, there is no main injection nor any pilot injection, so the or each post-injection does not burn in the cylinder since post-injection serves merely to vaporize fuel in the form of HCs which are converted by the catalyst-forming means.

The temperature at the inlet to the oxidation catalyst-forming means is thus very low and in spite of the exothermic nature of the catalytic reaction produced by the combustion of the HCs derived from the or each post-injection, the front face of the catalyst-forming means cools down progressively so its conversion activity becomes progressively deactivated.

During stages in which the engine is idling, in spite of using one or more post-injections, the temperature at the inlet of the catalyst-forming means is relatively low. The strategy of post-injection while idling also relies on catalyst conversion of the HCs produced by combustion of the post-injection(s) in the engine. In spite of the exothermic nature of the catalytic reaction, the front face of the catalyst-forming means cools progressively and its conversion activity becomes progressively deactivated.

During a stage of prolonged idling, it can happen that the catalyst-forming means are therefore no longer sufficiently active to convert all of the HCs, which leads to peaks of HCs downstream from the catalyst-forming means, or even to blue smoke and/or exhaust odors.

Furthermore, the use of post-injections leads to the fuel diluting the lubricating oil, thereby degrading its lubricating properties, and in particular reducing its viscosity, and if the viscosity becomes too low, that can lead to failure of the engine.

SUMMARY OF THE INVENTION

The object of the invention is to solve those problems.

To this end, the invention provides a system for assisting in the regeneration of depollution means associated with oxidation catalyst-forming means and integrated in an exhaust line of a motor vehicle diesel engine, and in which the engine is associated with common rail means for feeding fuel to the cylinders of the engine and adapted, at constant torque, to implement a strategy of regeneration by injecting fuel into the cylinders in at least one post-injection, the system being characterized in that it comprises:

detector means for detecting a request for regeneration and thus for post-injection;

detector means for detecting a stage during which the engine is idling;

acquisition means for acquiring the temperature downstream from the catalyst-forming means;

determination means for responding to said temperature to determine a maximum duration for the application of post-injections during a stage of idling; and reduction means for progressively reducing the or each post-injection as soon as the duration of post-injection utilization has reached the predetermined maximum duration of application.

According to other characteristics:

the reduction means are adapted to reduce the or each post-injection in application of a calibratable slope;

the depollution means comprise a particle filter;

the depollution means comprise a NOx trap;

the fuel includes an additive to be deposited together with the particles with which it is mixed on the depollution means in order to facilitate regeneration thereof;

the fuel includes a NOx trap forming additive; and the engine is associated with a turbocharger.

BRIEF DESCRIPTION OF THE DRAWINGS

The invention can be better understood on reading the following description given purely by way of example and made with reference to the accompanying drawing, in which.

DETAILED DECRIPTION OF PARTICULAR EMBODIMENTS

Figure 1:
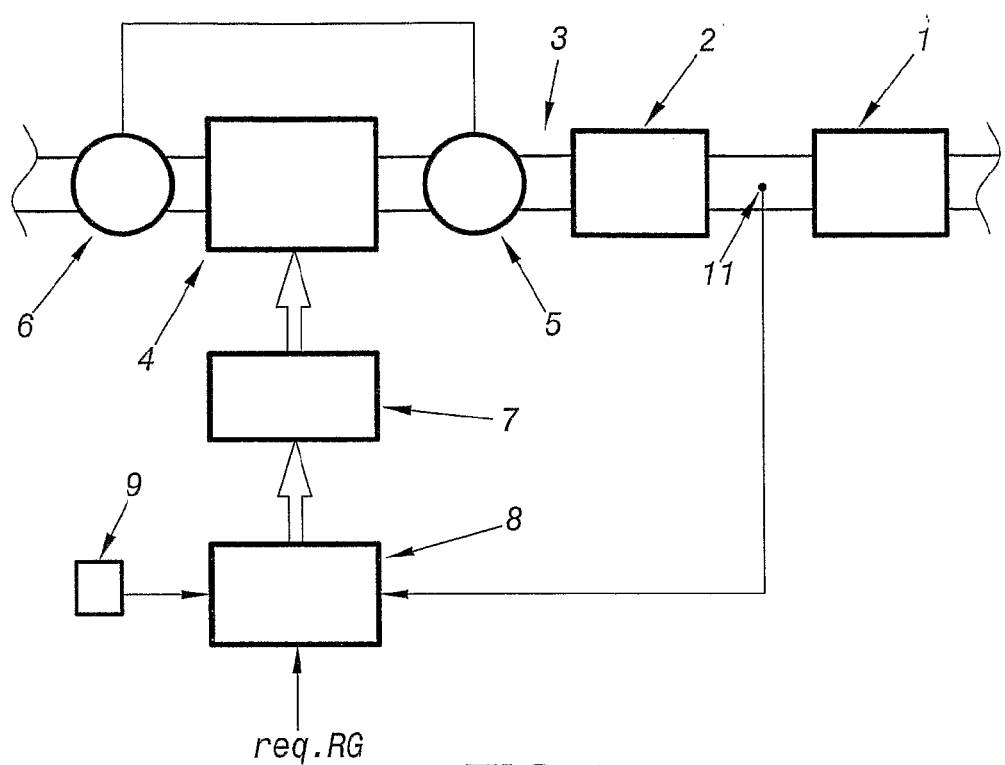
FIG. 1 is a block diagram showing the general structure of a system of the invention for assisting regeneration.

FIG. 1 shows the general structure of a system for providing assistance in regenerating depollution means, the depollution means being given overall reference 1 in the figure, that are associated with oxidation catalyst-forming means given overall reference 2, and that are integrated in an exhaust line 3 of a motor vehicle diesel engine 4.

The engine may be associated with a turbocharger, in which case the turbine portion 5 thereof is also associated with the exhaust line while the compressor portion 6 of the turbocharger is placed upstream from the engine.

Furthermore, the engine is also associated with common rail means 7 for feeding fuel to the cylinders of the engine and adapted, at constant torque, to implement a strategy of regeneration by injecting fuel into the cylinders in at least one post-injection operation, in conventional manner.

These means are controlled by a pilot unit given overall reference 8, adapted to detect a regeneration request req.RG as delivered for example by a supervisor of the depollution means, which request thus constitutes a request for post-injection, and the pilot unit is connected to means 9 for detecting a stage during which the engine is idling.

These means may have any suitable structure.

Furthermore, the pilot unit 8 is also connected to means for acquiring temperature downstream from the catalyst-forming means 2, these acquisition means being given overall reference 11.

These means comprise a suitable temperature sensor.

Figure 2:
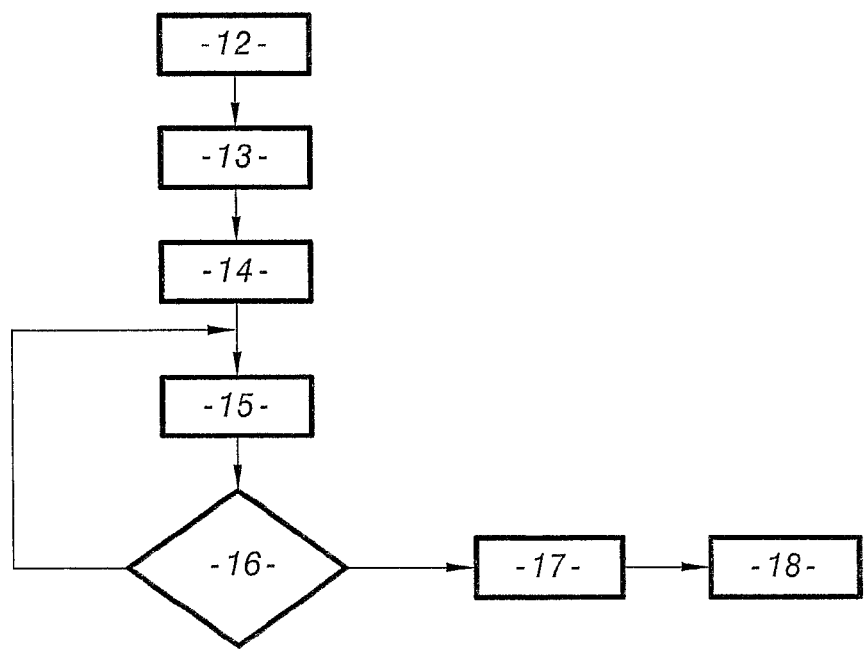
FIG. 2 is a flow chart showing the operation thereof.

This makes it possible, on detecting a request for regeneration and thus for post-injection, for the pilot unit 8 to detect that the engine is in a stage of idling, as represented by step 12 in FIG. 2.

The unit 8 is then adapted to acquire temperature downstream from the catalyst-forming means in a step 13 and to determine, on the basis of said temperature, a maximum duration for applying post-injections during the stage of idling, in a step 14.

The unit 8 then acts in steps 15 and 16 to monitor the duration of post-injection use, and to detect the moment when said duration of use reaches the predetermined maximum duration of the application.

As soon as the duration of use has reached the predetermined maximum duration of application while the engine is in a stage of idling, as represented by step 17, the pilot unit is adapted to reduce the or each post-injection progressively in application of a slope 18, e.g. a slope that can be calibrated.

It should also be observed that such a system can operate with depollution means constituted by a particle filter, a NOx trap, and that an additive for deposition together with the particles with which it is mixed on the depollution means in order to facilitate regeneration thereof can also be mixed in with the fuel in conventional manner for the purpose of reducing the combustion temperature of soot trapped in the depollution means.

In conventional manner, the additive is present in the particles after the additive-containing fuel has been subjected to combustion in the engine.

It is also possible to envisage using an additive that forms a NOx trap.

It will thus be understood that by means of such a structure a maximum duration post-injection application is authorized for a stage of idling.

This maximum duration can be represented in the form of a timer that empties, i.e. that counts down and/or decrements during a stage of idling in combination with a stage of regeneration. The counter is reinitialized at the end of this stage.

This system serves to limit the quantities of fuel that are post-injected during a stage of idling in which the temperature levels in the exhaust are the least favorable.

By limiting the total quantity of fuel that is post-injected in this way during this stage, which in any event is not the most effective from the point of view of regenerating the depollution means, the proportion of effective post-injection time is optimized and the extent to which engine lubricating oil is diluted by the fuel is limited.

Finally, this also makes it possible to limit the risk of the oxidation function suddenly ceasing to be active which would lead to a lack of HC conversion and thus to a puff of HC from the exhaust that would generate smoke and/or odors.

Naturally, other embodiments could be envisaged.

Thus, for example, the depollution means and the oxidation catalyst-forming means may be integrated in a single element, and in particular on a common substrate.

By way of example, a particle filter integrating the oxidation function could be envisaged.

Similarly, a NOx trap integrating such as oxidation function could also be envisaged, whether or not an additive is used.

The oxidation function and/or the NOx trap function could be implemented, for example, by an additive mixed with the fuel.

The invention claimed is:

1. A method for assisting in the regeneration of a depollution device associated with an oxidation catalyst and integrated in an exhaust line of a motor vehicle diesel engine, and in which the engine is associated with a common rail for feeding fuel to the cylinders of the engine and adapted, at constant torque, to implement a strategy of regeneration by injecting fuel into the cylinders in at least one post-injection, the method comprising:

detecting a request for regeneration and thus for post-injection;

detecting a stage during which the engine is idling;

acquiring the temperature downstream from the oxidation catalyst;

responding to said temperature by determining a maximum duration for the application of post-injections during a stage of idling; and progressively reducing the post-injections as soon as the duration of post-injection utilization has reached the predetermined maximum duration of application during this stage of idling.

2. A method according to claim 1, wherein the depollution device comprises a NOx trap.

3. A method according to claim 1, wherein the fuel includes an additive to be deposited together with the particles with which it is mixed on the depollution device in order to facilitate regeneration thereof.

4. A method according to claim 1, wherein the fuel includes a NOx trap forming additive.

5. A method according to claim 1, wherein the engine is associated with a turbocharger.

6. A method according to claim 1, wherein the depollution device comprises a particle filter.

7. A method according to claim 6, wherein the depollution device comprises a NOx trap.

8. A method according to claim 1, wherein the reduction means is adapted to reduce the post-injections in application of a calibratable slope.

9. A method according to claim 8, wherein the depollution device comprises a NOx trap.

10. A method according to claim 8, wherein the depollution device comprises a particle filter.

11. A method according to claim 10, wherein the depollution device comprises a NOx trap.

12. A system for assisting in the regeneration of depollution means associated with oxidation catalyst-forming means and integrated in an exhaust line of a motor vehicle diesel engine, and in which the engine is associated with common rail means for feeding fuel to the cylinders of the engine and adapted, at constant torque, to implement a strategy of regeneration by injecting fuel into the cylinders in at least one post-injection, the system comprising:

detector means for detecting a request for regeneration and thus for post-injection;

detector means for detecting a stage during which the engine is idling;

acquisition means for acquiring the temperature downstream from the catalyst-forming means;

determination means for responding to said temperature to determine a maximum duration for the application of post-injections during a stage of idling; and reduction means for progressively reducing the post-injections as soon as the duration of post-injection utilization has reached the predetermined maximum duration of application during this stage of idling.

13. A system according to claim 12, wherein the depollution means comprises a NOx trap.

14. A system according to claim 12, wherein the fuel includes an additive to be deposited together with the particles with which it is mixed on the depollution means in order to facilitate regeneration thereof.

15. A system according to claim 12, wherein the fuel includes a NOx trap forming additive.

16. A system according to claim 12, wherein the engine is associated with a turbocharger.

17. A system according to claim 12, wherein the depollution means comprises a particle filter.

18. A system according to claim 17, wherein the depollution means comprises a NOx trap.

19. A system according to claim 12, wherein the reduction means is adapted to reduce the post-injections in application of a calibratable slope.

20. A system according to claim 19, wherein the depollution means comprises a NOx trap.

21. A system according to claim 19, wherein the depollution means comprises a particle filter.

22. A system according to claim 21, wherein the depollution means comprises a NOx trap.

* * * * *